United States Patent [19]

Booth

[11] Patent Number: 4,514,193

[45] Date of Patent: Apr. 30, 1985

[54] SELF-CLEANING AIR CLEANER ASSEMBLY WITH ROTATING FILTER ELEMENT AND INERTIAL PRE-CLEANER

[75] Inventor: Donald S. Booth, Burnsville, Minn.

[73] Assignee: Donaldson Company, Inc., Minneapolis, Minn.

[21] Appl. No.: 634,462

[22] Filed: Jul. 26, 1984

[51] Int. Cl.³ ............................................. B01D 50/00
[52] U.S. Cl. ..................................... 55/290; 55/291; 55/302; 55/337
[58] Field of Search ................ 55/290, 291, 296, 302, 55/337, 424, 426

[56] References Cited

U.S. PATENT DOCUMENTS

| | | | |
|---|---|---|---|
| 3,449,891 | 6/1969 | Shohet et al. | 55/337 X |
| 3,483,676 | 12/1969 | Sargisson | 55/337 X |
| 3,667,195 | 6/1972 | Angilly, Jr. et al. | 55/272 |
| 3,816,981 | 6/1974 | Carnewal et al. | 55/267 |
| 3,837,149 | 9/1974 | West et al. | 55/269 |
| 3,936,902 | 2/1976 | Shackerton | 55/302 X |
| 3,957,639 | 5/1976 | Schoen et al. | 210/107 |
| 3,979,194 | 9/1976 | Wiser | 55/296 |
| 4,009,011 | 2/1977 | Ross | 55/273 |
| 4,222,755 | 9/1980 | Grotto | 55/291 |
| 4,242,115 | 12/1980 | Harold et al. | 55/347 |
| 4,266,953 | 5/1981 | Matthys et al. | 55/294 |
| 4,303,423 | 12/1981 | Champlin et al. | 55/337 |
| 4,377,401 | 3/1983 | Laughlin | 55/290 |

FOREIGN PATENT DOCUMENTS 1058033 2/1967 United Kingdom .
1190959 5/1970 United Kingdom .

Primary Examiner—Charles Hart
Attorney, Agent, or Firm—Merchant, Gould, Smith, Edell, Welter & Schmidt

[57] ABSTRACT

Cylindrical self-cleaning air cleaners are disclosed. In one embodiment a cylindrical element chamber is provided and is surrounded by an inertial tube pre-cleaner. A filter element is disposed in the element chamber supported for rotation by a turntable, which is sealed to prevent the passage of uncleaned air around and through the turntable. Nozzles are provided and are adaptable to a source of pressurized air, with the nozzles extending along the inside surface of the filter element to provide a line of pressurized reverse air flow. A slot is provided in the scavenging air chamber to receive particles dislodged from the filter element during a cleaning operation. Scavenging outlet ports are also provided to draw out scavenging air. In a cleaning operation the filter element is rotated and the pressurized air is blown back through the filter with dislodged particles exiting through the slot in the scavenging chamber and out the scavenging air outlet port. Additionally, a selectively openable bypass port is provided, so that the filter may be bypassed when desired. In another embodiment the inertial tube pre-cleaner is positioned on one end of the cylindrical filter housing, with the cleaner outlet port on the opposite end. The filter is mounted for rotational movement via a turntable, which is sealed, with a nozzle provided on the inside thereof, and a receiver tube radially aligned therewith on the outside of the filter, to receive particulate matter dislodged from the filter during a cleaning operation, channel it to the scavenging air chamber of the pre-cleaner, for disposal of the scavenging air port.

12 Claims, 5 Drawing Figures

SELF-CLEANING AIR CLEANER ASSEMBLY WITH ROTATING FILTER ELEMENT AND INERTIAL PRE-CLEANER

TECHNICAL FIELD OF THE INVENTION

The present invention generally relates to air cleaner assemblies and more particularly to air cleaner assemblies which utilize a pre-cleaner section in combination with a barrier filter element and which are self-cleaning.

BACKGROUND OF THE INVENTION

Serious problems have been encountered in the operation of truck, tank and helicopter engines in dusty, sandy or ocean environments where particularly corrosive contaminants are prevelant. If not filtered, such contaminants can corrode or wear operating parts excessively, necessitating more frequent maintenance and significantly reducing the operating life of the engine.

Various air filters have been developed for such applications, utilizing a variety of air cleaning techniques. For instance, inertial separation, also known as centrifical separation, has been found to be an efficient means to remove large amounts of dust or sand from large airstreams. Other contaminants, however, are not easily removed by inertial separation and must be removed by a barrier filter element or like apparatus.

Due to the nature of the contaminants removed by inertial separators and the nature of their operation they have a relatively long operating life between cleanings. This makes them particularly well adapted for use in demanding military environments where relatively long operating life between maintainence is always important and sometimes essential. On the other hand, barrier filter elements generally have a much shorter operating life between cleanings, especially when used in dusty environments. Such filters are, however, quite efficient in removing finer particulate matter and other contaminants such that numerous mechanisms have been developed to clean the filter while it is operating and thereby extend the interval between maintainence.

It has been recognized that combining inertial separation for pre-cleaning with self-cleaning barrier filter techniques produces an efficient air cleaner with a relatively long service life. An example of such a design is shown in U.S. Pat. No. 4,303,423 to Camplin et al. That filter, however, and others like it, is susceptible to reintrainment of particulate contaminants dislodged from the filter during cleaning because the cleansing reverse air flow tends to interrupt the operation of the pre-cleaner swirl, such that dislodged contaminants are reintroduced to the cleaning medium instead of being scavenged away. Also, that filter has no bypass capability, which as U.S. Pat. No. 3,483,676 to Sargisson teaches is highly desireable such that when necessary unimpeded air intake may be provided to attain maximum performance of the engine.

SUMMARY OF THE INVENTION

The present invention provides a self-cleaning air cleaner including an inertial pre-cleaner, a cylindrical barrier filter element and means for cleaning the element with a high pressure reverse air flow while the air cleaner is operating. In addition, one embodiment of the invention provides for unobstructed bypass of the inertial pre-cleaner and filter element via a bypass port.

According to one aspect of the invention a plurality of wall members are provided to define a cylindrical filter element chamber having an outlet port on one end thereof, and a scavenging air chamber. The scavenging air chamber includes a plurality of inertial tube pre-cleaners supported in the air chamber for receiving air to be filtered from outside the filter, separating solid material from the air, and delivering the separated air to the element chamber. A scavenging air outlet port is formed through one of the wall members and is adapted to be coupled to a negative pressure source for drawing scavenged air and solid materials intermixed therewith from the scavenging air chamber. Inside the filter element chamber a cylindrical barrier filter element is concentrically disposed, and is rotatable on a turntable supporting the filter element on ball bearings and supplying rotational energy to the filter element. A seal is provided around the perimeter of the bearings in order to prevent the leakage of separated air around the filter element through the bearings. An air nozzle is disposed on the interior of the filter element with its axis substantially parallel to the axis of the filter element and in close proximity to the filter element, the nozzle connectable to a source of pressurized air for directing a reverse flow of air through the filter element for cleaning. Means are provided for receiving matter dislodged from the element while being cleaned and directing it to said scavenging air chamber to be scavenged away.

According to another aspect of the invention the scavenging air chamber including said inertial tube pre-cleaners circumferentially surrounds the element chamber. Slot means are provided in the interior wall of the scavenging chamber extending parallel and opposite to the nozzle means to provide a path for the air expelled from the nozzle through the filter and into the scavenging air chamber from where it may be scavenged. Thus, the filter may be cleaned by rotating the filter and directing a reverse flow of pressurized air through the nozzle. Optionally, a selectively openable bypass port is provided on the end of the air cleaner opposite the outlet port to provide a direct unimpeded and unfiltered path for air through the filter.

According to a further aspect of the invention a further cylindrical air cleaner is provided with the scavenging air chamber, including the inertial tube pre-cleaners, capping one end of the air cleaner so that contaminated air is drawn in an intake end of the air cleaner and exits from an outlet port on the other end. A receiver is provided and extends from a port in the scavenging chamber into the element chamber on the outward side of the filter element opposite the nozzle interior said filter element, thus providing a path to the scavenging chamber for pressurized air and dislodged contaminants exiting the filter element.

According to another aspect of the invention the turntable includes a first annular bearing disposed between the filter element and one end wall of the air cleaner, with the bearing including a first member providing an annular stationary race mounted to the one end wall and a second member providing an annular rotating race to which one end of the filter element is mounted.

According to yet another aspect of the invention the second member includes gear teeth and a motor and gear is provided and mounted to the end wall for engaging the teeth and rotating the filter element.

According to yet another aspect of the invention the seal comprises one or more annular wiper seals terminated to the end wall in said scavenging air chamber to lap against the second member to prevent leakage of air under or through the turntable.

DETAILED DESCRIPTION OF THE INVENTION

Figure 1:
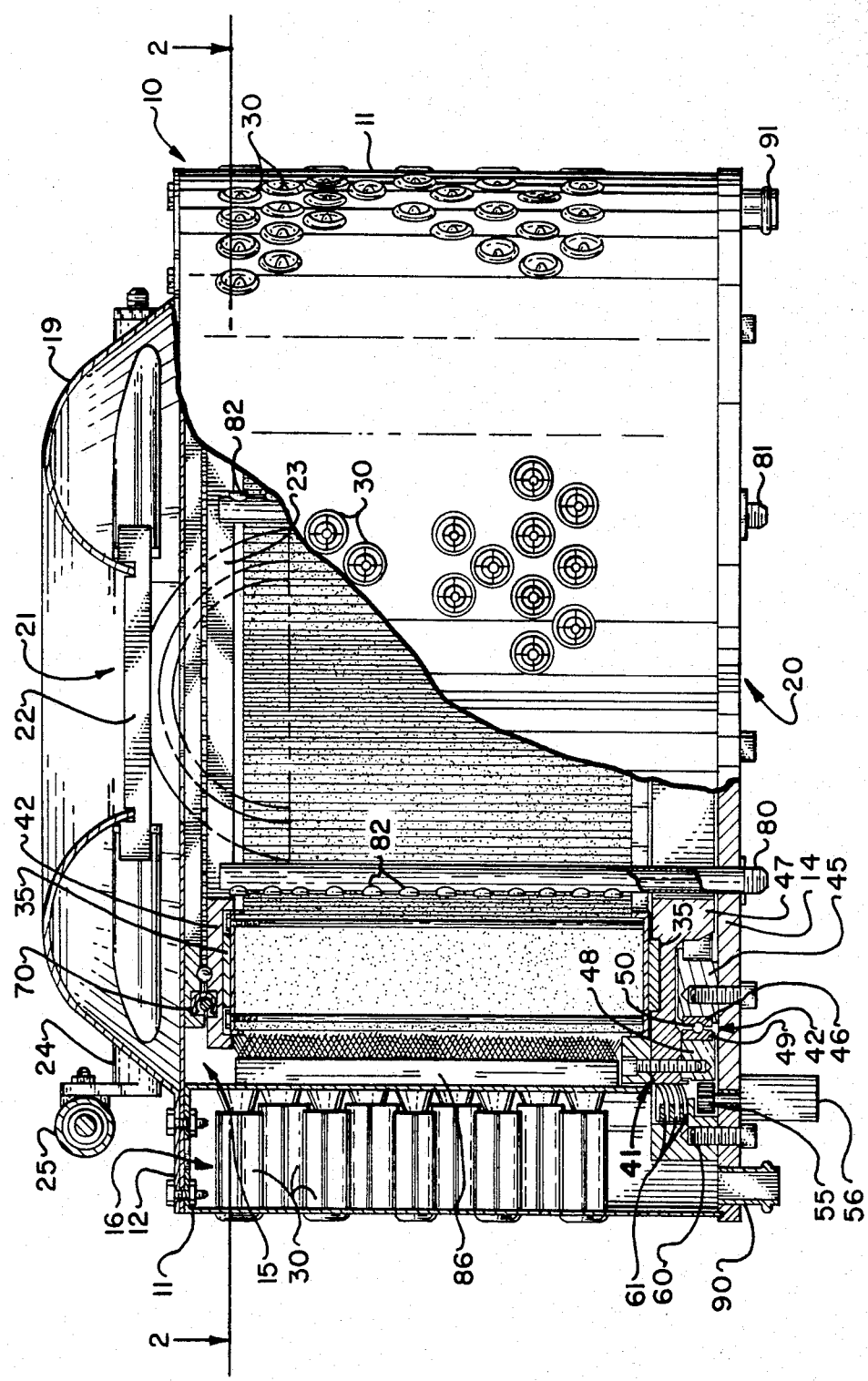
FIG. 1 is a cut-away sectional view of the first embodiment of the air cleaner according to the present invention.
Figure 2:
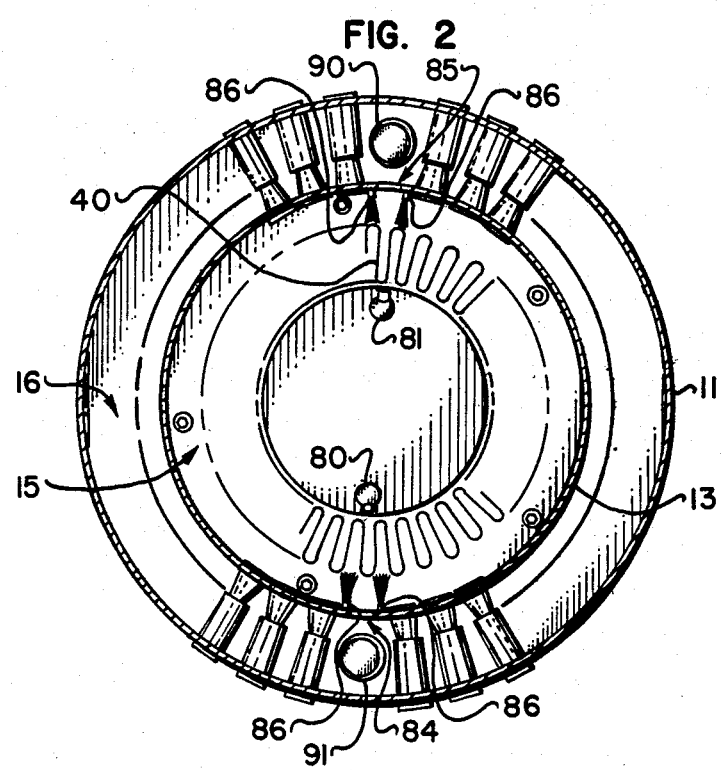
FIG. 2 is an end sectional view taken along the line 2—2 if FIG. 1.

Referring to FIGS. 1 and 2, in which like elements are identified with like reference numerals, there is shown a first embodiment of the air cleaner according to the present invention. A plurality of wall members 11-14 are connected to provide a cylindrical filter element chamber 15 and a scavenging air chamber 16 surrounding element chamber 15 circumferentially. A circular outlet port 20 is provided on one end of the filter, while on the other end a bypass port 21 is provided. Port 21 is surrounded by a cowling 19 and is normally blocked by bypass doors 22 and 23, which operate in a trapdoor like fashion, as opened and closed by mechanical linkages, such as linkage 24 for door 23. Although not shown, it shall be understood that a like linkage is also provided for door 22, such that both may be opened and closed as desired. Preferably, remotely operated piston 25 is provided to control both linkages in unison.

Figure 3:
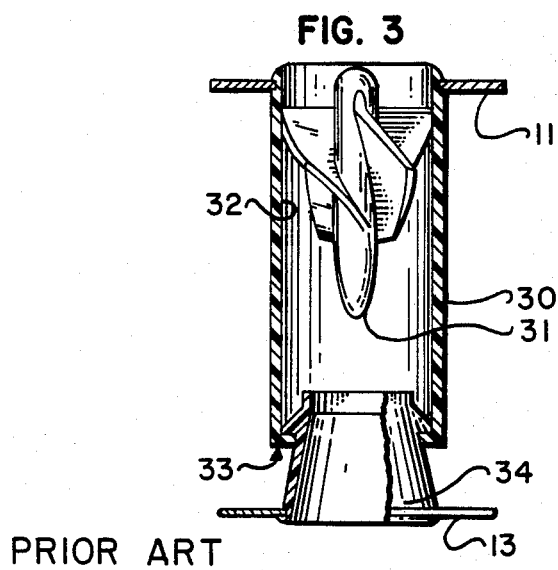
FIG. 3 is a sectional view of an inertial pre-cleaner tube according to the present invention.

Inertial tube pre-cleaners 30 are supported between sidewall members 11 and 13 to extend through the scavenging air chamber 16. As shown more clearly in FIG. 3, inertial tube pre-cleaners 30 each include a deflecting element 44 which, as air is drawn through it from the outside to the inside of the filter, produces a swirling motion in the air to cause it to rotate in a spiral fashion. As the air swirls through the tube, larger dirt particles or other heavy materials are thrown outwardly against the inner wall surface 32. The dirt particles thereafter pass through the gap 33 into the scavenging air chamber 15. The clean air at the center of the tube passes downwardly and out through the center of an outlet tube 34, and into the filter element chamber.

Cylindrical barrier filter element 40 is supported inside the filter element chamber 15, and is preferably of a pleated variety, as are well known in the art. Element 40 is supported within chamber 15 between rotatable turntable 41 on one end and the annular bearing 42 on the other. Preferably, a resilient ring 35 is interference fit to the turntable to provide a seal on each end thereof. Turntable 41 includes a further annular member 45 mounted to end wall member 14 via a plurality of bolts, and includes an annular race 46 extending around the outside perimeter thereof. The turntable further includes a platform member 47 bolted to a further member 48 including a further annular race 49. Ball bearings 50 are provided between the races, such that platform 47 may rotate in a circular manner. Around the outside perimeter of member 48 there are provided a plurality of gear teeth for engaging the gear teeth on sprocket 55, which is connected via a shaft to a selectively energizable motor 56. A planetary gear arrangement is thus provided whereby platform 47 may be rotated.

An annular sealing member 60 is provided and includes a plurality of resilient annular rings 61, wherein the air is prevented from leaking past the barrier filter element 40 and under or through the turntable 41 and out of the outlet port 20. Thus, unfiltered air is prevented from passing through the filter and dirt and grit are kept out of the turntable bearing mechanisms.

Bearing 42 at the other end of filter element 40 also includes a pair of annular race members and a plurality of ball bearings positioned therebetween. As in the case of turntable 41 and seal 60 an annular resilient seal member 70 is provided to prevent the leakage of air around the barrier filter element 40.

A pair of nozzles 80 and 81 are provided, and extend upwardly through wall member 14 into the filter element chamber on the inward side of the barrier filter element 40. Nozzles 80 and 81 are positioned near to the inward wall of the barrier filter element 40, preferably in radially opposite positions, and each include a plurality of ports 82. Each of nozzles 80 and 81 are preferably threaded or otherwise connectable to a source of pressurized air.

Slots 84 and 85 are provided in the inner wall of scavenging air chamber 16, opposite the respective nozzles 80 and 81. Preferably, brushes 86 are provided on either side of the slots 84 and 85 running along the length of the slots, extending to very near the outward surface of filter element 40. Fluid communication between scavenging air chamber 16 and the exterior volume of filter element chamber 15 is thereby minimized.

A pair of scavenging air outlet ports 90 and 91 are provided, and include means for coupling to a source of negative pressure for drawing scavenged air and solid materials intermixed therewith from the scavenging air chamber 16, as is well known in the art.

In operation, outlet port 20 of air cleaner 10 is coupled to the intake of the engine. A source of negative pressure, approximately 1/10 of that provided at the outlet port 20 by the engine intake, is applied at scavenging air outlet ports 90 and 91, such that contaminated air is drawn in through inertial tube precleaners 30 around the sides of the filter, is cleaned and pased through to filter element chamber 15, is drawn through barrier element 40, and exits, filtered, through outlet port 20 to the engine intake. Under normal operating conditions bypass port 21 remains blocked via bypass doors 22 and 23 in their closed position, and filter element 40 remains stationary within the filter. When it becomes necessary to clean barrier filter element 40, pressurized air is directed through nozzles 80 and 81 and filter element 40 is rotated via turntable 47 and motor 56. In the embodiment as shown, a line of pressurized air may thus be applied to the surface of the entire filter after a one-half rotation thereof. As the pressurized air is applied and the element rotates, accumulated contaminants are dislodged from the filter, and generally forced by the pressurized air and in addition drawn by the source of negative pressure in the scavenging air chamber, through slots 84 and 85, and thus out the scavenging air ports 90 and 91.

Although not shown in the drawing, it shall be understood suitable well known means may be provided to sense pressure differentials across the filter element and determine when it needs to be cleaned, and to effectuate the energization of motor 56 and the application of pressurized air to nozzles 80 and 81. As might be appreciated, it shall be understood that any number of nozzle and receiver slots may be provided, and that cleaning of the filter be accomplished by any number of rotations thereof with indexed valve arrangements. Also, it shall be understood that the invention is not limited to the particular barrier filter element or inertial tube precleaning mechanisms disclosed, and that the bypass port 21 is not essential to the invention.

Figure 4:
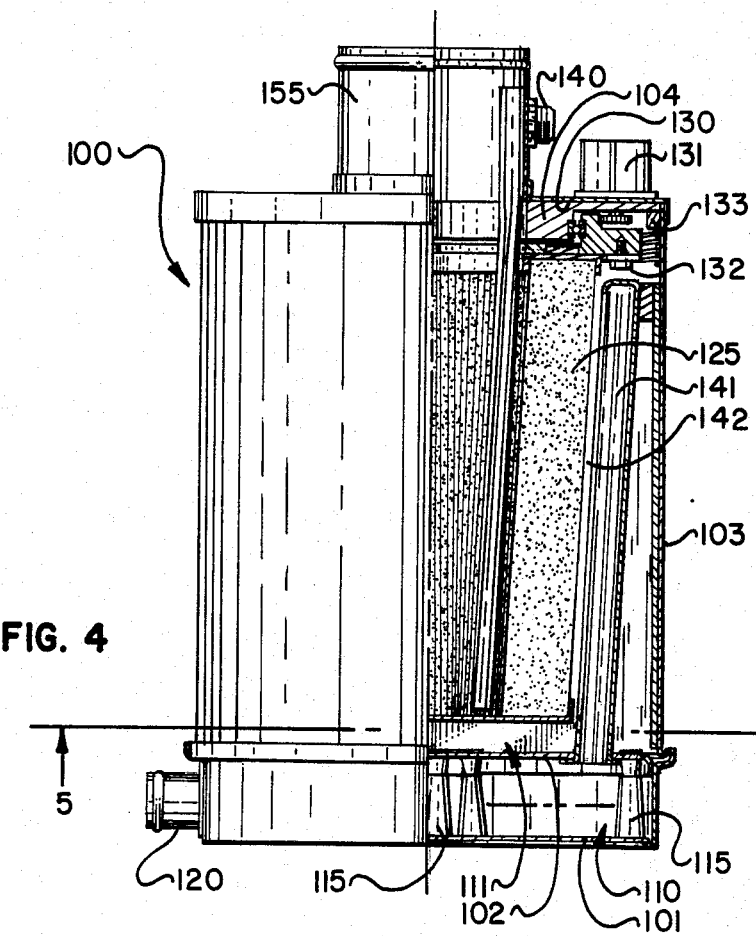
FIG. 4 is a cut-away sectional view of a second embodiment of the air cleaner according to the present invention.
Figure 5:
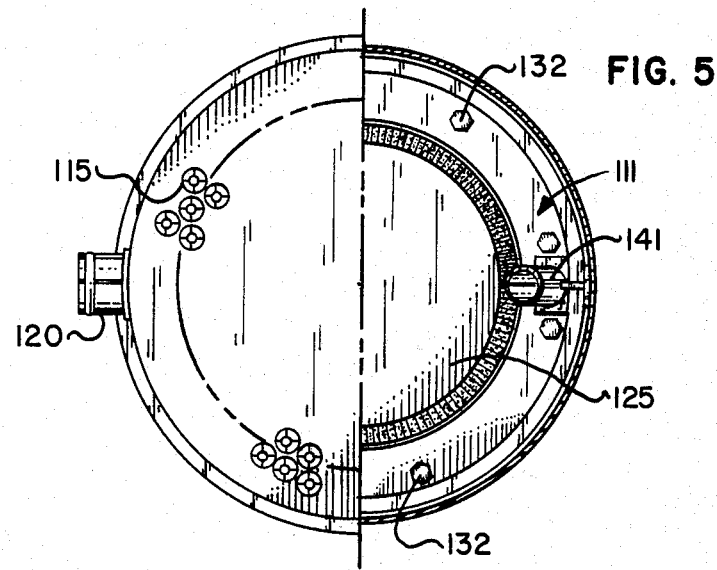
FIG. 5 is an end cut-away sectional view taken in part along the lines 5—5 of FIG. 5.

Referring to FIGS. 4 and 5 there is shown an alternate embodiment of the air cleaner according to the present invention. In this embodiment air is drawn through one end of the filter 100 and exits at the other end. A plurality of wall members 101–104 form a scavenging air chamber 110 and filter element chamber 111. Inertial tube pre-cleaners 115 are supported between wall members 101 and 102, operating in the same manner as described above with respect to inertial tube pre-cleaners 30 to filter air drawn in through the intake end of the filter and deliver that air to the filter element chamber 111. A scavenging air outlet port 120 is provided, to be coupled to a source of negative pressure in order to draw scavenged air and solid materials intermixed therewith from the scavenging air chamber. A frustum shaped filter element 125, of the barrier type and closed on the smaller diameter end, is provided and is mounted for rotational movement via turntable 130 under the power of motor and gear assembly 131, in the same manner as discussed above with respect to filter element 40 and turntable 41. It shall be understood, however, that the frustrum shape of filter element 125 is not essential to the invention, and that any substantially cylindrical shape may be used. Filter element 125 is fastened to turntable 130 via a flange and bolts 132, although this means of attachment is not essential to the invention, and any other suitable means may be employed. A seal 133 is provided, and is functionally identical to seal 60 of the embodiment of FIGS. 1 and 2.

A nozzle 140 is provided, and like nozzles 80 and 81 is adapted for connection to a source of pressurized air, and includes a plurality of ports, for providing a line of pressurized air over the inward surface of filter element 125. A receiver 141 is provided, generally taking the form of a tube with a slot 142 running the length thereof generally radially opposite the ports of nozzle 140.

In operation the air cleaner of FIGS. 4 and 5 functions to draw air through the pre-cleaner inertial tubes, into the element chamber and through the barrier filter element 125 to exit from outlet port 155, which of course is connected to an engine intake. Scavenging air outlet port 120 is connected to a suitable source of negative pressure in order to draw scavenged air from the scavenging air chamber 10. When cleaning is necessary, motor 131 may be activated, to rotate turntable 130 and filter element 125, while pressurized air is applied to nozzel 140. As a line of air under pressure is blown through filter element 125, receiver 141 effectively vacuums dislodged contamination from the filter into the scavenging air chamber 110, in a similar fashion as explained above with respect to nozzles 80 and 81 and slots 84 and 85 of air cleaner 10. It is contemplated that it may be desirable to provide an ejector to increase the vacuum in the receiver.

Thus, the present invention provides a highly efficient self-cleaning air cleaner suitable for use in dusty and dirty environments wherein long operating life between maintenance is necessary. In the first and presently preferred embodiment of FIGS. 1 and 2 the air cleaner provides both for the elimination of a receiver, and thus a reduced part count, and for an unobstructed bypass through the air cleaner so that maximum engine power may be developed when necessary. Both embodiments, however, provide for relatively long operating life, and for the elimination of complicated sealing arrangements as have been used in the prior art in order to rotate the nozzle elements. Moreover, it shall be seen that the air cleaner of the present invention permits the scavenging air chambers, slots and nozzles as shown in the first embodiment, and the receiver and nozzle as shown in the second embodiment, to remain stationary with respect to one another, and thereby avoid the problematic synchronization, sealing, and bearing problems if such were to be rotated about the perimeter of the filter element simultaneously. Moreover, the present invention provides a method of rotating the filter in a simple and efficient manner, while maintaining a good seal.

Numerous characteristics and advantages of the invention have been set forth in the foregoing description, together with details of the structure and function of the invention. The disclosure, however, is illustrative only, and changes may be made in detail, especially in matters of shape, size and arrangement of the parts, within the principle of the invention, to the full extent intended by the broad general meaning of the terms in which the appended claims are expressed.

I claim:

1. An air cleaner assembly comprising:

a plurality of wall members defining a cylindrical filter element chamber having an outlet port and a scavenging air chamber;

a plurality of inertial tube pre-cleaners supported in said air chamber for receiving air to be filtered from outside the filter, separating solid materials from said air, and delivering separated air to said element chamber;

a scavenging air outlet port formed through one of said wall members and adapted to be coupled to a negative pressure source for drawing scavenged air and solid materials intermixed therewith from said scavenging air chamber;

a cylindrical barrier filter element concentrically disposed in said element chamber with the interior of said filter element in fluid communication with said outlet port;

turntable and seal means for supporting said filter element for rotational movement and for sealing said filter element to prevent the leakage of separated air around said filter element and out of said outlet port;

air nozzle means disposed on the interior side of said filter element with its axis substantially parallel to the axis of the filter element and in close proximity to said filter element, said nozzle connectable to a source of pressurized air for directing a reverse flow of air through said filter element to dislodge filtered particles accumulated on said filter element; and means providing a port between said filter element chamber and said scavenging air chamber to provide a fluid path from said filter element chamber to said scavenging air chamber whereby dislodged particles are carried away from the outward surface of said filter.

2. An air cleaner assembly according to claim 1 wherein said scavenging air chamber circumferentially surrounds said filter element chamber and wherein said means providing a port comprises a slot in a mutual wall of said chambers, said slot being opposite to said nozzle means.

3. An air cleaner assembly according to claim 1 wherein said scavenging air chamber covers the end of said air cleaner and wherein receiver means are provided to extend along the side of said filter element and provide a path for dislodged particles from the filter element chamber to the scavenging air chamber.

4. A cylindrical air cleaner assembly wherein contaminated air is drawn in the sides of the air cleaner and exits from an end outlet port opening into the center of the air cleaner, comprising:

a plurality of wall members defining a cylindrical filter element chamber and a scavenging air chamber circumferentially surrounding the filter element chamber;

a plurality of inertial tube pre-cleaners supported in said air chamber for receiving air to be filtered from outside the filter, separating solid materials from said air, and delivering separated air to said element chamber;

a scavenging air outlet port formed through one of said wall members and adapted to be coupled to a negative pressure source for drawing scavenged air and solid materials intermixed therewith from said scavenging air chamber;

a cylindrical barrier filter element concentrically disposed in said element chamber with its radially outward surface near the inner wall of said scavenging air chamber through at least one arc of its surface, the interior of said filter element in fluid communication with said outlet port;

turntable and seal means for supporting said filter element for rotational movement and for sealing said filter element to prevent the leakage of separated air around said filter element and out of said outlet port;

air nozzle means disposed on the interior side of said filter element with its axis substantially parallel to the axis of the filter element and in close proximity to said filter element along said one arc thereof, said nozzle connectable to a source of pressurized air for directing said air through said filter element toward said scavenging chamber, said air selectively delivered to dislodge filtered particles accumulated on said filter element; and slot means in the interior wall of said scavenging chamber extending parallel and opposite to said nozzle means and providing a path for said air into said scavenging air chamber.

5. An air cleaner according to claim 4 wherein said air cleaner includes a selectively openable bypass port on the end opposite said outlet port to provide a direct unfiltered path for air to said outlet port, thereby bypassing the centrifugal separators and the filter element.

6. An air cleaner according to claim 4 wherein said turntable means includes a first annular bearing means disposed between said filter element and one endwall of said air cleaner.

7. An air cleaner according to claim 6 wherein said first annular bearing means includes a first member providing an annular stationary race mounted to the one endwall and second member providing an annular rotating race to which one end of said filter element is mounted, and wherein said second member includes gear teeth and wherein said air cleaner further includes motor and gear means mounted on said one endwall for engaging said gear teeth and rotating said filter element.

8. An air cleaner according to claim 7 wherein said seal means comprises one or more annular wiper seals terminated to the endwall in said scavenging air chamber and lapping against said second member to prevent leakage of air under or through said turntable means.

9. A cylindrical air cleaner assembly wherein contaminated air is drawn in an intake end of the air cleaner and exits from an outlet port on the other end which opens into the center of the cleaner, comprising:

a plurality of wall members defining a cylindrical filter element chamber opening at one end to an outlet port and a scavenging air chamber capping the other end and forming the intake end of the cleaner;

a plurality of inertial tube pre-cleaners supported in said air chamber for receiving air to be filtered from outside the filter, separating solid materials from said air, and delivering separated air to said element chamber;

a scavenging air outlet port formed through one of said wall members and adapted to be coupled to a negative pressure source for drawing scavenged air and solid materials intermixed therewith from said scavenging air chamber;

a substantially cylindrical barrier filter element concentrically disposed in said element chamber, the interior of said filter element in fluid communication with said outlet port;

turntable and seal means for supporting said filter element for rotational movement and for sealing said filter element to prevent the leakage of separated air around said filter element and out of said outlet port;

air nozzle means disposed longitudinally on the inward side of said filter element in close proximity thereto, said nozzle connectable to a source of pressurized air for directing said air through said filter element toward said scavenging chamber, said pressurized air selectively delivered to dislodge filtered particles accumulated in said filter element; and receiver means extending from a port in said scavenging chamber into said element chamber on the outward side of said filter element, said receiver means running substantially parallel to and opposite said nozzle means and providing a path for said pressurized air.

10. An air cleaner according to claim 9 wherein said turntable means includes a first annular bearing means disposed between said filter element and one endwall of said air cleaner.

11. An air cleaner according to claim 10 wherein said first annular bearing means includes a first member providing an annular stationary race mounted to the one endwall and second member providing an annular rotating race to which one end of said filter element is mounted, and wherein said second member includes gear teeth and wherein said air cleaner further includes motor and gear means mounted on said one endwall for engaging said gear teeth and rotating said filter element.

12. An air cleaner according to claim 11 wherein said seal means comprises one or more annular wiper seals terminated to the endwall in said scavenging air chamber and lapping against said second member to prevent leakage of air under or through said turntable means.

* * * * *